(12) United States Patent
Dölger et al.

(10) Patent No.: US 7,699,407 B2
(45) Date of Patent: Apr. 20, 2010

(54) INDUSTRIAL TRUCK

(75) Inventors: Marcus Dölger, Haibach (DE); Franz Huber, Aschaffenburg (DE); Andreas Hölscher, Aschaffenburg (DE); Bernward Welschof, Grossostheim (DE)

(73) Assignee: Linde Material Handling GmbH, Aschaffenburg (DE)

( * ) Notice: Subject to any disclaimer, the term of this patent is extended or adjusted under 35 U.S.C. 154(b) by 965 days.

(21) Appl. No.: 11/435,377

(22) Filed: May 16, 2006

(65) Prior Publication Data
US 2006/0289223 A1 Dec. 28, 2006

(30) Foreign Application Priority Data
May 17, 2005 (DE) ............ 10 2005 022 554
Apr. 25, 2006 (DE) ............ 10 2006 019 088

(51) Int. Cl.
*B60T 7/12* (2006.01)
(52) U.S. Cl. .................. 303/13; 188/170; 180/306
(58) Field of Classification Search .......... 303/3, 303/9.61, 9.62, 22.1, 22.5, 50, 114.1, 13; 180/306; 188/170; 137/625.69
See application file for complete search history.

(56) References Cited

U.S. PATENT DOCUMENTS

| | | | |
|---|---|---|---|
| 2,525,461 A * | 10/1950 | Schnell ................ 318/372 |
| 4,072,360 A | 2/1978 | Carroll et al. | |
| 4,657,315 A * | 4/1987 | Belart .................. 303/114.1 |
| 6,053,205 A | 4/2000 | Feldmann | |
| 6,183,049 B1 * | 2/2001 | Oka et al. ............. 303/114.1 |
| 7,052,094 B2 * | 5/2006 | Ganzel ................ 303/114.1 |
| 7,413,264 B2 * | 8/2008 | Matsuno et al. ...... 303/114.1 |
| 2002/0070068 A1 * | 6/2002 | Eriksen et al. ......... 180/306 |
| 2004/0227396 A1 * | 11/2004 | Kusano ................ 303/113.1 |

FOREIGN PATENT DOCUMENTS

DE 197 52 022 A1 5/1999

* cited by examiner

*Primary Examiner*—Christopher P Schwartz
(74) *Attorney, Agent, or Firm*—The Webb Law Firm (57) ABSTRACT

A working machine, such as an industrial truck, having a spring-loaded brake having a braking position and a release position and controlled by a brake valve producing a brake-release pressure. The brake valve is operatively connected to a service brake input device, such as a brake pedal, and can be acted upon in the direction of a reduction in the brake-release pressure arising at the spring-loaded brake when the service brake input device is actuated. It being possible, on actuation, for the service brake input device to be operatively connected to a pre-stressed spring device, which is operatively connected to the brake valve and can be acted upon in the direction of an increase in the spring force on increasing actuation of the service brake input device.

14 Claims, 6 Drawing Sheets

INDUSTRIAL TRUCK

CROSS-REFERENCE TO RELATED APPLICATION

This application claims priority to German Application No. 10 2005 022 554.3, filed May 17, 2005, and German Application No. 10 2006 019 088.2, filed Apr. 25, 2006, both of which applications are herein incorporated by reference in their entirety.

BACKGROUND OF THE INVENTION

1. Field of the Invention

The invention relates to a working machine, such as an industrial truck, having a spring-loaded brake. The brake has a braking position and a release position, and can be controlled by means of a brake valve producing a brake-release pressure.

2. Technical Considerations

In the case of mobile working machines in the form of industrial trucks, a spring-loaded brake is provided, which is used as a parking brake. Using the spring-loaded brake, which is acted upon in the braking position, the industrial truck can be kept at a standstill on slopes or in the case of a traction drive which is not being driven. During driving of the industrial truck, the spring-loaded brake is acted upon so as to be brought into the release position. The spring-loaded brake is, in this case, acted upon by means of a spring so as to be brought into the braking position and can be acted upon by means of a brake-release pressure produced by a pressure medium source, counter to the force of the spring, so as to be brought into the release position.

A generic working machine in the form of an industrial truck and having a spring-loaded brake used as a parking brake is shown in DE 197 52 022 A1, herein incorporated by reference.

With such working machines, a service brake is also necessary, with which metered braking of the industrial truck can be achieved by an operator when actuating a service brake input device. In known working machines, in addition to the spring-loaded brake, a separate service brake, for example a mechanical or hydraulic service brake, is provided for this purpose, which results in a high degree of complexity in terms of design for the service brake.

Therefore, it is an object of the present invention to provide a working machine of the generic type mentioned initially but which can be provided with a service brake with less complexity in terms of design, which service brake has good metering capability.

SUMMARY OF THE INVENTION

This object is achieved according to the invention by providing a brake valve that is operatively connected to a service brake input device, such as a brake pedal. The brake valve can be acted upon in the direction of a reduction in the brake-release pressure arising at the spring-loaded brake when the service brake input device is actuated. It being possible, on actuation, for the service brake input device to be operatively connected to a pre-stressed spring device, which is operatively connected to the brake valve and can be acted upon in the direction of an increase in the spring force on increasing actuation of the service brake input device. By means of a brake valve, which produces the brake-release pressure for acting on the spring-loaded brake so as to bring it into the release position, and which can be acted upon in the direction of a reduction in the brake-release pressure by means of a service brake input device, the spring-loaded brake can be acted upon in a controlled manner in the direction of the braking position, and the spring-loaded brake can be used as the service brake with little complexity in terms of design. With a pre-stressed spring device, which acts upon the brake valve in the direction of a reduction in the brake-release pressure when the service brake input device is actuated, good metering capability of the service brake is achieved. In contrast to a spring device that is operatively connected to the brake valve and has a linear characteristic, in the case of which the brake-release pressure is reduced linearly and proportionally with respect to the actuation of the service brake input device, which results in a long idle travel of the service brake input device up to the beginning of the braking function of the spring-loaded brake used as the service brake owing to a braking torque being built up by the spring-loaded brake and, thus, results in merely a short actuation travel of the service brake input device being available in which a metering capability of the spring-loaded brake used as the service brake is made possible by means of the brake-release pressure being controlled, with a pre-stressed spring device that is operatively connected to the brake valve and acts upon the brake valve in the direction of a reduction in the brake-release pressure, a short idle travel of the service brake input device can be achieved up to the point at which a braking torque of the spring-loaded brake is built up and a long actuation travel of the service brake input device can be made available, in which the brake-release pressure of the spring-loaded brake used as the service brake can be reduced in a controlled manner and, thus, metered braking of the working machine can be achieved.

In accordance with one preferred embodiment of the invention, the pre-stress of the spring device is dimensioned such that the brake-release pressure is reduced to a value which is in the range in which the spring-loaded brake begins to build up a braking torque. When the service brake input device is actuated, as soon as, on actuation, the service brake input device is thus operatively connected to the spring device, the brake-release pressure produced by the brake valve is reduced, by the pre-stress of the spring device, to a value in the range in which the spring-loaded brake begins to build up a braking torque. As a result, a short idle travel of the service brake input device up to the beginning of the braking function of the service brake can be achieved by means of a braking torque produced by the spring-loaded brake. The brake-release pressure determined by the pre-stress of the spring is expediently slightly above the pressure at which the spring-loaded brake begins to build up a braking torque, as a result of which it is possible to compensate for tolerances of the spring-loaded brake and to ensure that a braking effect of the spring-loaded brake sets in only once the idle travel and a further actuation of the service brake input device have been overcome.

Particular advantages result if the service brake input device, in accordance with one embodiment of the invention, can be operatively connected to the spring device in the case of an actuation travel in the range of 0-10% of the maximum actuation travel of the service brake input device, such as an actuation travel of 4%. The brake-release pressure produced by the brake valve can thus be reduced in a controlled manner above an actuation travel of 4% of the maximum actuation travel of the service brake input device. As a result of which, a short idle travel up to the beginning of the braking function of the spring-loaded brake used as the service brake is achieved, and metered driving of the spring-loaded brake into the braking position can be achieved and, thus, metered braking of the working machine by means of the spring-loaded brake used as the service brake over a long actuation travel of the service brake input device.

If the spring device, in accordance with one advantageous development of the invention, can be overdriven in the case of an actuation travel of the service brake input device in the range of 80-100% of the maximum actuation travel of the service brake input device, such as 90%, it is ensured that the brake-release pressure is completely reduced in the case of this actuation travel by means of the brake valve being driven directly and mechanically by the service brake input device, and, thus, the spring-loaded brake is acted upon so as to be brought into the braking position. Within a long actuation travel of between 4% and 90% of the maximum actuation travel of the service brake input device, in this case a controlled reduction in the brake-release pressure achieves metered driving of the spring-loaded brake, which is used as the service brake, and, thus, metered braking of the working machine by means of the spring-loaded brake used as the service brake.

The brake valve is expediently in the form of a pressure reduction valve, in particular a three-way pressure reduction valve, which is connected on the input side to a brake-release pressure supply line and on the output side to a brake-release line, which is connected to a control pressure space of the spring-loaded brake, which space acts in the direction of the release position, and is connected to a tank line, which is passed to a tank, it being possible for the pressure reduction valve to be acted upon by means of a spring in the direction of a switching position, which connects the brake-release pressure supply line to the brake-release line, and by the brake-release pressure arising in the brake-release line, as well as by means of the spring device in the direction of a switching position, which connects the brake-release line to the tank line. With such a three-way pressure reduction valve, in the case of which the pre-stressed spring device, which can be actuated by means of the service brake input device, counteracts the spring, which determines the brake-release pressure when the service brake input device is not driven, of the pressure reduction valve, the force of the spring being reduced owing to an increase in the spring force of the spring device when the service brake input device is actuated, it is possible in a simple manner for the brake-release pressure to be reduced in a controlled manner depending on the actuation of the service brake input device.

In accordance with one preferred refinement of the invention, the spring device has a spring, which is clamped between a spring plate and a spring bearing plate, which is connected to the spring plate. As a result, a spring device having a pre-stressed spring can be made available with little complexity in terms of design.

The pre-stress of the spring can be adjusted in a particularly advantageous manner by inserting adjustment washers. As a result, the brake-release pressure predetermined by the spring pre-stress, and at which the spring-loaded brake begins to build up a braking torque, can be altered and adjusted with little complexity in terms of design.

In this case, the spring plate expediently bears against a valve plunger of the brake valve. Owing to the fact that the spring plate of the spring device bears loosely against the valve plunger of the brake valve, it is ensured that the pre-stressed spring does not exert any force on the valve plunger when the service brake input device is not actuated, and, thus, the brake-release pressure is determined by the spring of the brake valve.

Particular advantages result if the spring bearing plate can be operatively connected to the service brake input device, a distance being formed between the spring bearing plate and the service brake input device when the service brake input device is not actuated. The distance between the spring bearing plate and the service brake device makes it possible for the spring device to bear loosely against the valve plunger of the brake valve in the unactuated state of the service brake input device, in which case the idle travel of the service brake input device can be adjusted by the distance.

One development of the invention envisages that the spring bearing plate is connected to the spring plate by means of an adjustment element, such as an adjustment screw, in which case the distance between the spring bearing plate and the service brake input device can be adjusted by means of the adjustment element. It is possible with such an adjustment element in the form of an adjustment screw to adjust and alter the idle travel of the service brake input device and, thus, the actuation travel in which the service brake input device is operatively connected to the spring bearing plate and, thus, the spring device in a simple manner.

The adjustment element is expediently secured against becoming detached, as a result of which the adjusted pre-stress of the spring of the spring device and the distance between the spring bearing plate and the service brake input device and, thus, the brake-release pressure at which the spring-loaded brake begins to build up a braking torque and the idle travel of the service brake input device are prevented from being unintentionally adjusted.

One advantageous development of the invention envisages that the spring device has at least one further spring, which is arranged between the spring plate and the spring bearing plate, a distance being formed between the further spring and the spring plate and/or the spring bearing plate when the service brake input device is not actuated. Owing to additional springs, which are effective in the case of a specific actuation travel of the brake actuation device, which actuation travel corresponds to the distance between the further spring and the spring plate and/or the spring bearing plate, it is possible in a simple manner to alter the profile of the brake-release pressure, as a result of which the braking performance of the spring-loaded brake used as the service brake can be altered and adapted in a simple manner and, thus, a suitable braking performance for the working machine can be adjusted in a simple manner by means of the spring-loaded brake, which can be used as the service brake.

The distance between the further spring and the spring plate and/or the spring bearing plate can expediently be adjusted by inserting adjustment washers, as a result of which the actuation travel of the service brake device, in which the brake-release pressure is influenced by the further spring, can be adjusted and altered in a simple manner.

In accordance with one preferred embodiment of the invention, the spring bearing plate is in the form of a sleeve, which can be operatively connected to the spring plate when the service brake input device is actuated, a distance being formed between the spring plate and the sleeve when the service brake input device is not actuated. Owing to such a design of the pre-stressed spring device, it is possible in a simple manner to achieve direct mechanical driving of the brake valve by means of the service brake input device and, thus, a complete reduction in the brake-release pressure, it being possible for the actuation travel of the direct mechanical driving of the brake valve and thus the overdriving of the spring device to be adjusted and altered by the distance between the spring plate and the sleeve.

In accordance with one advantageous development of the invention, a reaction device is provided, which is operatively connected to the service brake input device, and can be acted upon by the brake-release pressure. The subjective feeling of the metering capability of the service brake is determined for the operator by the actuation force to be applied to the service brake input device. With a reaction device which is acted upon by the brake-release pressure, it is possible in a simple manner for a resetting force to be produced on the service brake input device, which resetting force counteracts the actuation force to be applied, depending on the produced brake-release pressure, and it is, therefore, possible for an actuation force to be produced which is matched to the characteristic for the brake-release pressure and, thus, to the characteristic for the braking force. Owing to this reaction of the brake-release pressure on the service brake input device, the actuation force can be weakened or intensified in a simple manner depending on the brake-release pressure produced, and it is thus possible to achieve good metering capability of the service brake for the operator.

In accordance with one preferred refinement, the reaction device is in the form of a piston, which has a first pressure space, which acts in the direction of an increase in the actuation force of the service brake input device, and/or a second pressure space, which acts in the direction of a reduction in the actuation force of the service brake input device. Owing to the piston being acted upon in a corresponding manner, it is thus possible in a simple manner for the actuation force to be applied to the service brake input device to be increased or weakened and, thus, for the actuation force to be matched to the characteristic of the brake-release pressure and, thus, the characteristic of the braking force.

If the first pressure space can be acted upon by the brake-release pressure, and the second pressure space can be relieved of load, the actuation force to be applied to the service brake input device can be weakened in a simple manner with increasing actuation of the service brake input device and, thus, decreasing brake-release pressure.

If, in accordance with one preferred refinement, the first pressure space can be acted upon by a supply pressure arising in the brake-release pressure supply line, and the second pressure space can be acted upon by the brake-release pressure, an increased actuation force can be produced with increasing actuation of the service brake input device and, thus, decreasing brake-release pressure, in which case the actuation force increases in a manner inversely proportional to the reduction in the brake-release pressure.

BRIEF DESCRIPTION OF THE DRAWINGS

Further advantages and details of the invention will be explained in more detail with reference to the exemplary embodiments illustrated in the schematic figures, in which like reference numbers identify like parts throughout.

DESCRIPTION OF THE PREFERRED EMBODIMENTS

Figure 1:
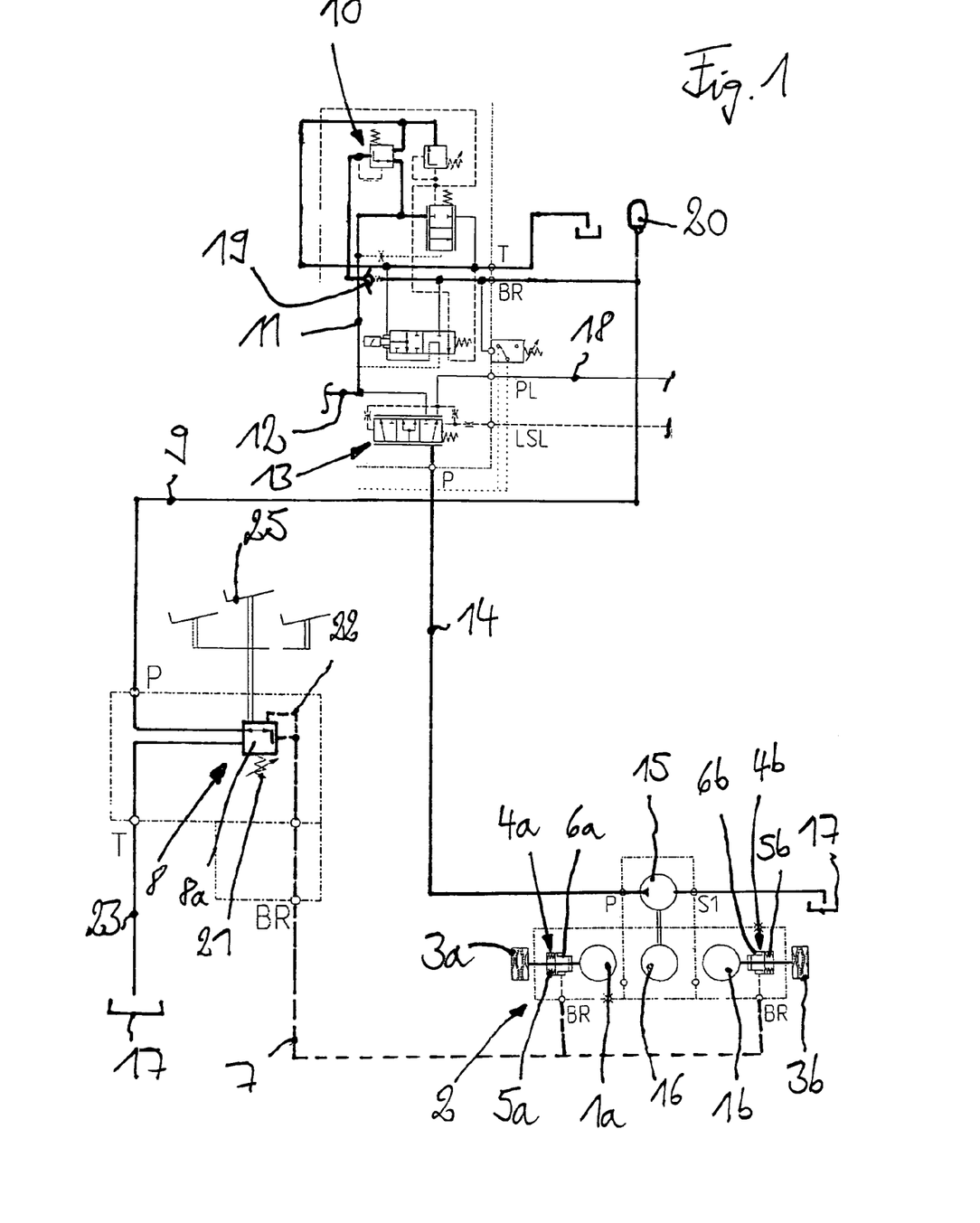
FIG. 1 shows the circuit diagram of a spring-loaded brake, which is used as the service brake, of an industrial truck.

FIG. 1 illustrates a hydraulic circuit diagram of a working machine in the form of an industrial truck. The industrial truck has a traction drive, which is formed by traction motors $1a$, $1b$, for example hydraulic motors or electric motors, which are operatively connected to drive wheels (not illustrated) via a spring-loaded brake 2. The spring-loaded brake 2 comprises, for example, brake devices $3a$, $3b$, which are in the form of multiple-disc brakes associated with the traction motors $1a$, $1b$, and can be acted upon by means of an actuating device $4a$, $4b$ so as to be moved between a release position and a braking position. The actuating device $4a$, $4b$ comprises an actuating piston, which can be acted upon by a spring $5a$, $5b$ in the direction of the braking position of the brake devices $3a$, $3b$. A control pressure space $6a$, $6b$, which acts in the direction of the release position of the brake devices $3a$, $3b$ and, thus, counter to the spring $5a$, $5b$, and is connected to a brake-release line 7 carrying brake-release pressure, is also formed on the actuating piston.

According to the invention, the brake-release line 7 is connected on the output side to a brake valve 8, which is in the form of a pressure reduction valve $8a$, and is connected on the input side to a brake-release pressure supply line 9. The brake-release pressure supply line 9 is connected to a delivery branch line 11, with the interconnection of a pressure-reducing valve 10, the delivery branch line 11 being connected to a delivery branch line 12 for the working hydraulics of the industrial truck, and control valves (not illustrated) for controlling a lifting drive, an inclination drive, and at least one additional drive for the industrial truck are connected to the delivery branch line 12. The delivery branch line 12 is connected to a delivery line 14 of a pressure medium source 15, in the form of a pump, with the interconnection of a priority valve 13. The pressure medium source 15 is operatively connected to a drive motor 16 in the form of an electric motor or a combustion engine and draws pressure medium from a tank 17. A hydraulic steering device (not shown) of the industrial truck can preferably be supplied pressure medium from the delivery line 14 by means of the priority valve 13 via a delivery branch line 18.

A blocking valve 19, which is in the form of a non-return valve, and is open in the direction towards the brake valve 8, is arranged in the brake-release pressure supply line 9 passed from the pressure-reducing valve 10 to the brake valve 8. Downstream of the blocking valve 19, a pressure medium store 20 is connected to the brake-release pressure supply line 9.

The brake valve 8, which is in the form of a pressure reduction valve $8a$, in particular a three-way pressure reduction valve, and is connected on the input side to a brake-release pressure supply line 9 and on the output side to the brake-release line 7, is acted upon by means of a spring 21 in the direction of a switching position which connects the brake-release pressure supply line 9 to the brake-release line 7. The pressure reduction valve $8a$ is acted upon by the brake-release pressure arising in the brake-release line 7 in the direction of a switching position, which connects the brake-release line 7 to a tank line 23, which leads to the tank 17, counter to the force of the spring 21. For this purpose, a control line 22 branches off from the brake-release line 7 and is passed to a corresponding control pressure space of the pressure reduction valve $8a$, which counteracts the spring 21.

Figure 2:
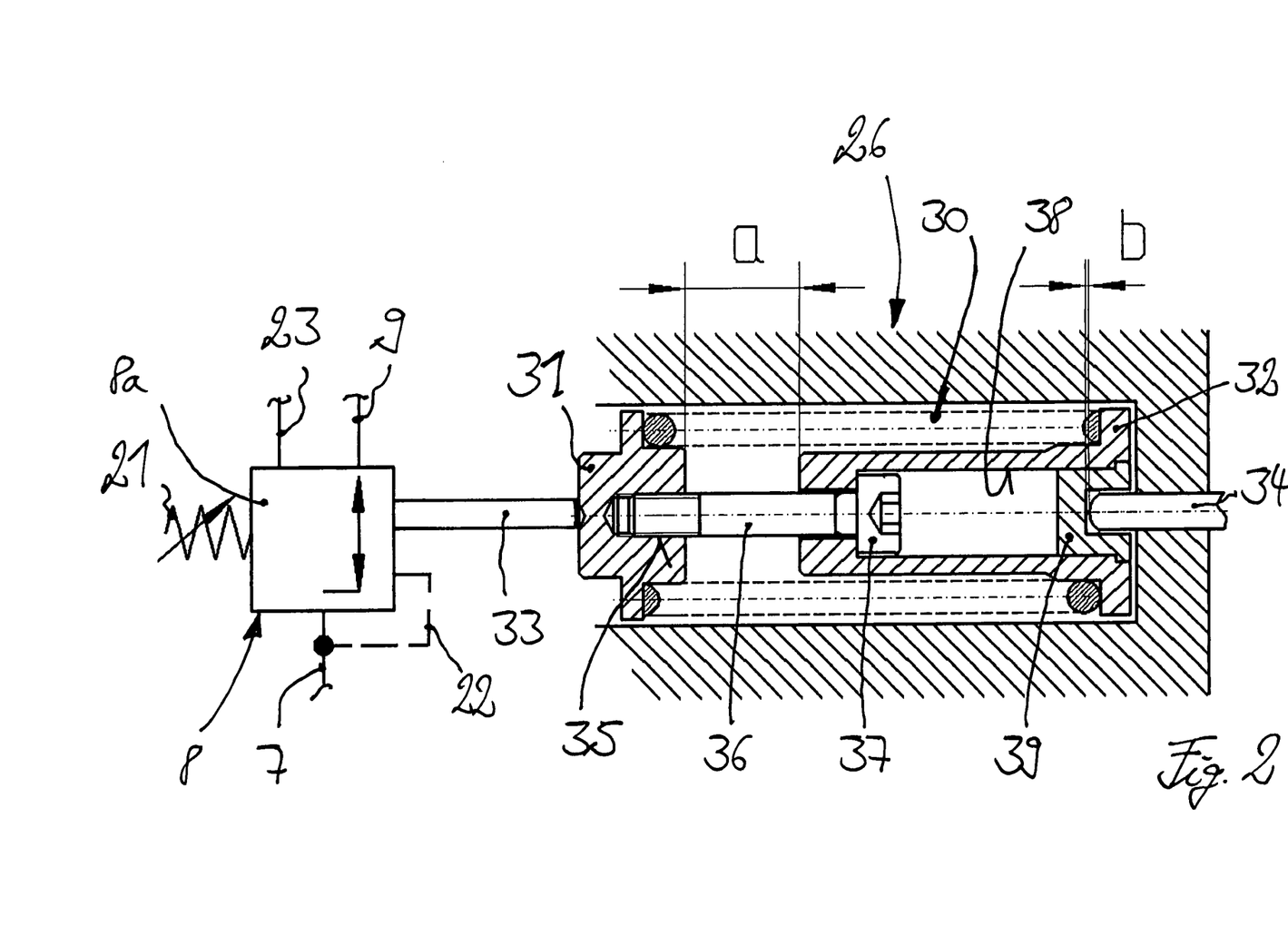
FIG. 2 shows a first embodiment of the brake valve.

The pressure reduction valve $8a$ can be acted upon in the direction of the switching position, which connects the brake-release line 7 to a tank line 23 and, thus, in the direction of a reduction in the brake-release pressure arising in the brake-release line 7, depending on the actuation of a service brake input device 25 in the form of a brake pedal. For this purpose, the pressure reduction valve $8a$, as is illustrated in FIG. 2, is provided with a spring device 26, which can be operatively connected to the service brake input device 25 and acts upon the pressure reduction valve $8a$, counter to the spring 21, so as to bring it into the switching position which connects the brake-release line 7 to the tank line 23 and, thus, in the direction of a reduction in the brake-release pressure arising in the brake-release line 7.

The spring device 26 is in the form of a pre-stressed spring device and has a spring 30, which is clamped between a spring plate 31 and a spring bearing plate 32 in the form of a sleeve. The spring plate 31 in this case bears against a control slide 33 of the pressure reduction valve 8a. The spring bearing plate 32 is provided with a cut-out 38 in the form of a drilled hole, in which a closure element 39 is fixed, which can be operatively connected to an actuating plunger 34, which is connected to the service brake input device 25. In the neutral position illustrated when the service brake input device 25 is not actuated, a distance "b" is formed between the actuating plunger 34 and the closure element 39 and, thus, the spring bearing plate 32. The spring plate 31 is provided with a threaded hole 35 in which an adjustment element 36, in the form of an adjustment screw, is fixed. The adjustment element 36 extends into the cut-out 38, in the form of a drilled hole, in the spring bearing plate 32, an adjustment head 37 being formed on the adjustment element 36 and bearing against a drilled-hole shoulder of the cut-out 38. The spring bearing plate 32, in the form of a sleeve, is spaced apart from the spring plate 31 by the distance "a" in the neutral position when the service brake input device 25 is not actuated.

Figure 3:
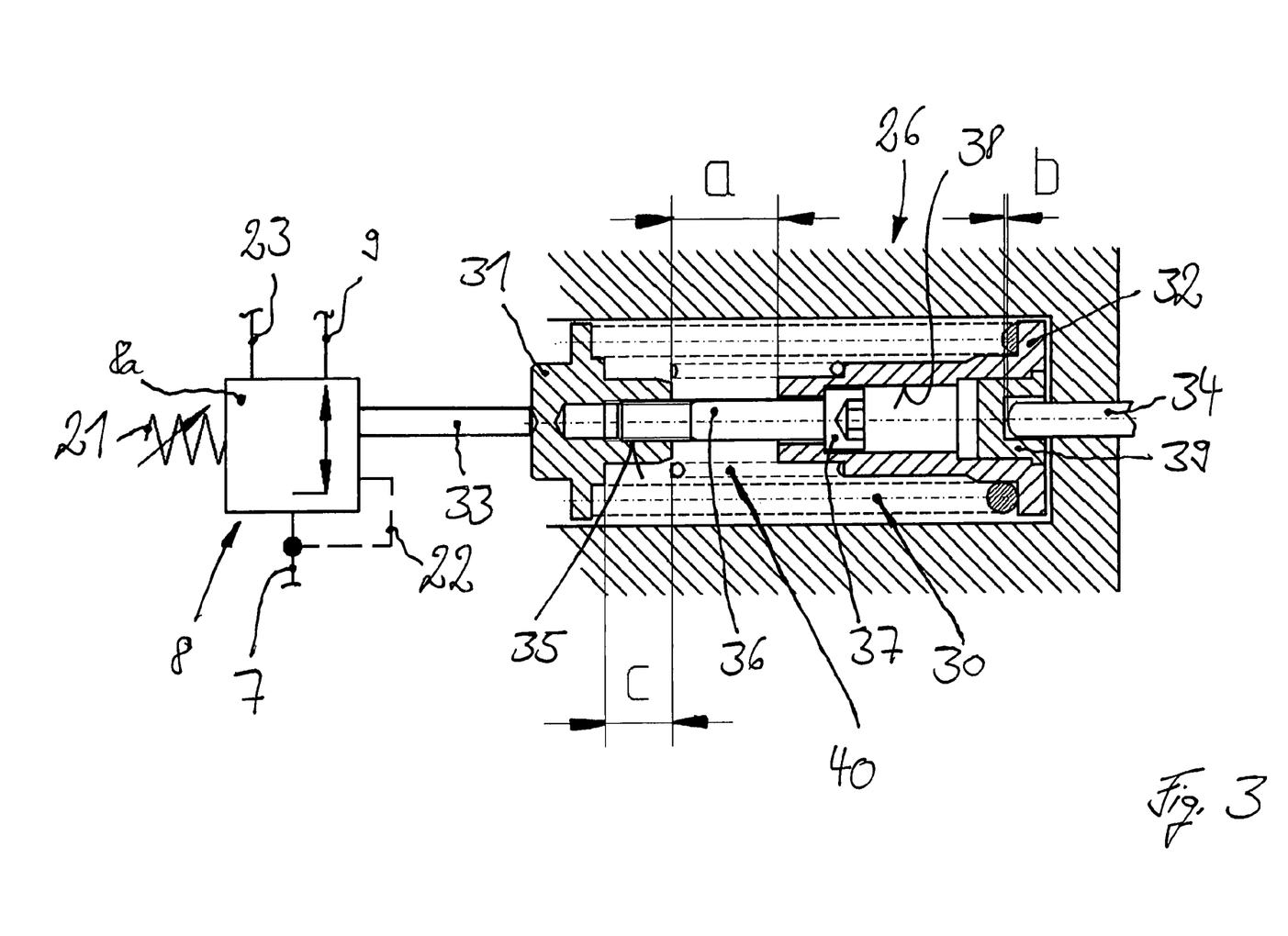
FIG. 3 shows a second embodiment of the brake valve.

FIG. 3 illustrates a second embodiment of a brake valve 8 according to the invention. The spring device 26 has, in addition to the spring 30 which is clamped between the spring plate 31 and the spring bearing plate 32 in the form of a sleeve, a further spring 40, which is arranged between the spring plate 31 and the spring bearing plate 32. In this case, the spring 40 is supported on a shoulder of the spring bearing plate 32. In the neutral position, when the service brake input device is not actuated, a distance "c" is formed between the spring 40 and the spring plate 31.

The function of the invention will be explained below with reference to the brake valves illustrated in FIGS. 2 and 3, and the characteristics illustrated in FIGS. 4 and 5.

Figure 4:
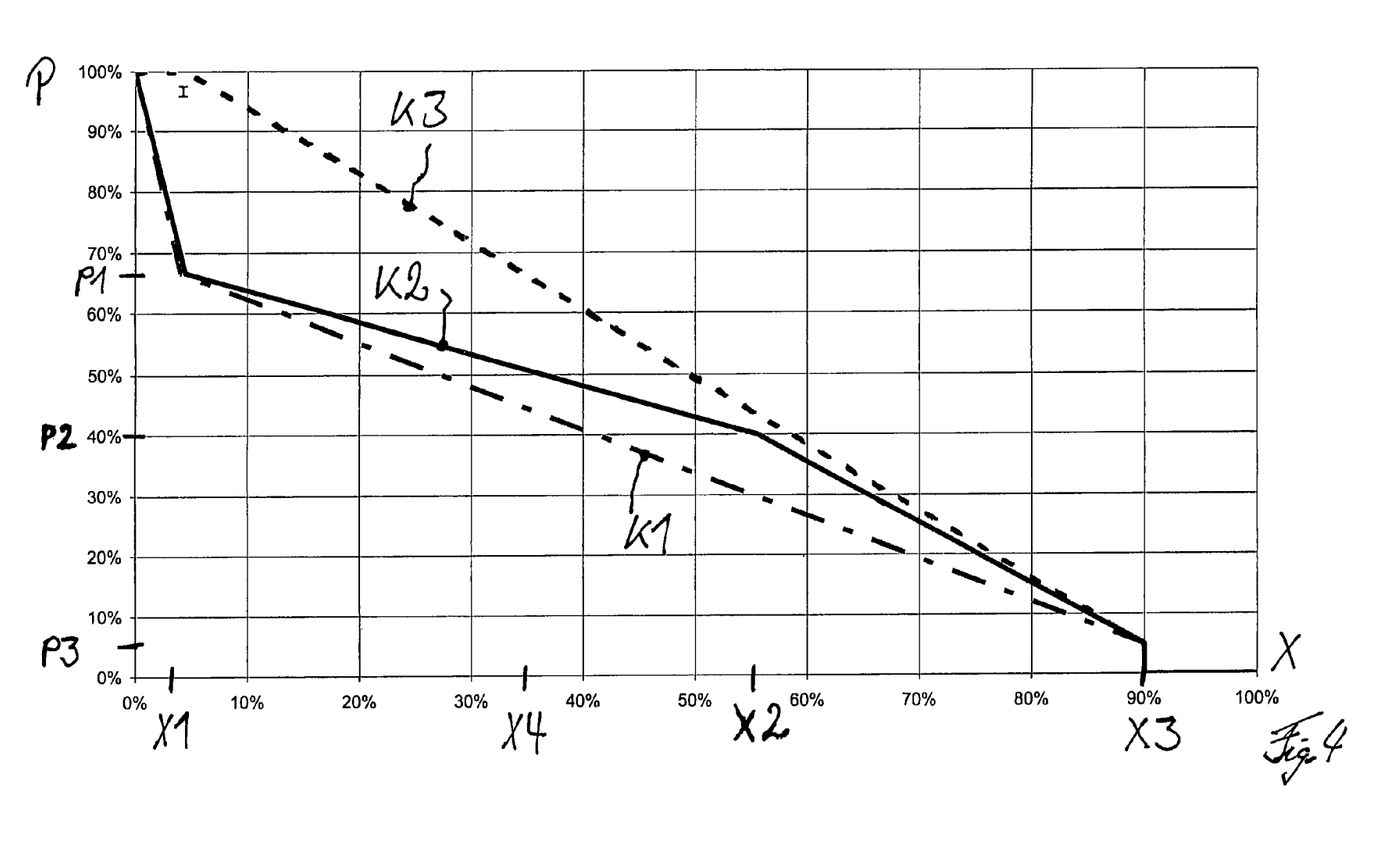
FIG. 4 shows the profile of the brake-release pressure.

FIG. 4 shows characteristics of the brake-release pressure which is produced by the brake valve 8 and arises in the brake-release line 7, the actuation travel X of the service brake input device 25 being plotted on the x axis and the brake-release pressure P being plotted on the y axis. In this case, FIG. 4 illustrates a characteristic K1 of the brake-release pressure of a brake valve 8 having a spring device 26, as shown in FIG. 2, and a characteristic K2 of the brake-release pressure of a brake valve 8 having a spring device 26, as shown in FIG. 3. In addition, the characteristic K3 of the brake valve is illustrated in which the brake-release pressure is reduced linearly and proportionally with respect to the actuation of the service brake input device 25. The brake-release pressure P1, which corresponds to a value of approximately 65% of the maximum brake-release pressure, corresponds to a brake-release pressure at which the spring-loaded brake 2 begins to build up a braking torque.

Figure 5:
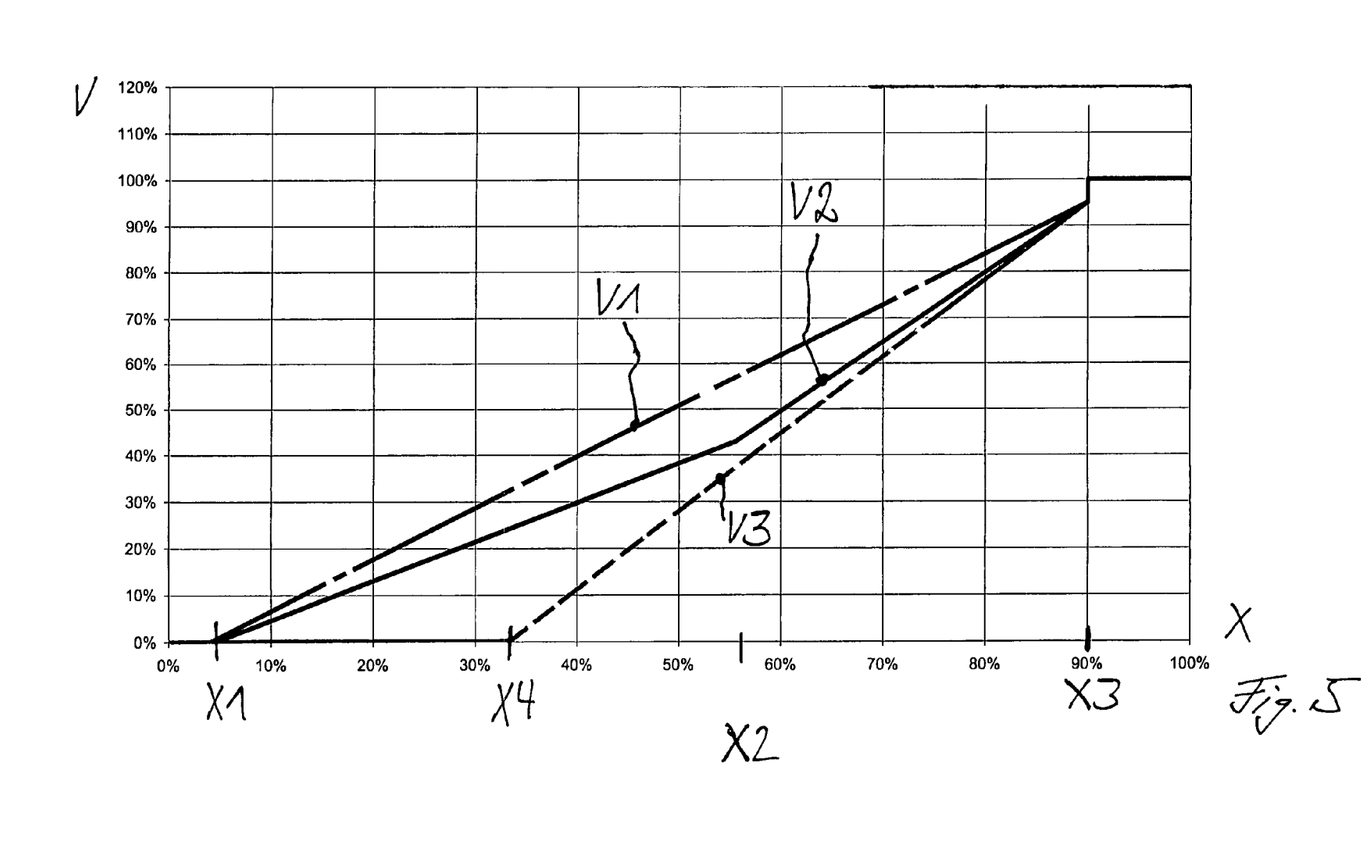
FIG. 5 shows the profile of the deceleration of the working machine.

FIG. 5 shows characteristics for the deceleration of the working machine, the actuation travel X of the service brake input device 25 being plotted on the x axis and the deceleration V being plotted on the y axis. The characteristic V1 corresponds to a deceleration which comes about at a brake-release pressure as shown by the characteristic K1 in the figure. The deceleration shown by the characteristic V2 results in the event of a characteristic K2 for the brake-release pressure as shown in FIG. 4. The deceleration shown by the characteristic V3 results in the case of a brake-release pressure as shown by the characteristic K3 in FIG. 4.

When the service brake input device 25 is not driven, the brake-release pressure P arising in the brake-release line 7 is determined by the spring 21 of the brake valve 8. The pre-stressed spring device 26 bears loosely against the control slide 33 of the pressure reduction valve 8a. Owing to the distance "b" between the spring device 26 and the actuating plunger 34 of the service brake input device 25, in this case no force is exerted on the control slide 33 by the spring device 26. The spring-loaded brake 2 is acted upon so as to be brought into the release position.

If the service brake input device 25 is actuated, the actuating plunger 34 comes to bear against the closure element 39 and, thus, the spring bearing plate 32 in the case of the actuation travel X1, which corresponds to the distance "b" in FIGS. 3 and 4 and is adjusted to a value of approximately 4% of the maximum actuation travel of the service brake input device 25. The pre-stressed spring device 26 thus acts upon the control slide 33 of the pressure reduction valve 8a, counter to the force of the spring 21, as a result of which the force of the spring 21 is reduced and the pressure reduction valve 8a is acted upon in the direction of the switching position, which connects the brake-release line 7 to the tank line 23. In this case, the brake-release pressure is reduced by the pre-stress of the spring 30 of the spring device 26 to the brake-release pressure P1 at which the spring-loaded brake 2 begins to build up a braking torque. Up to the actuation travel X1, no braking torque is thus produced by the spring-loaded brake 2, in which case there is no deceleration V of the working machine.

From the actuation travel X1 onwards, the spring 30 of the spring device 26 is acted upon in the direction of an increase in the spring force owing to the spring bearing plate 32 being acted upon so as to be moved to the left, in FIGS. 2 and 3, with increasing actuation travel of the service brake input device 25. With increasing actuation travel of the service brake input device 25, the force of the spring 30, which counteracts the spring 21, thus increases, as a result of which the force of the spring 21 is reduced and thus the pressure reduction valve 8a is acted upon in the direction of the switching position, which connects the brake-release line 7 to the tank line 23 and, thus, the brake-release pressure arising at the spring-loaded brake 2 is reduced.

The brake-release pressure arising in the brake-release line 7 is, in this case, reduced in the case of a spring device 26 as shown in FIG. 2 in accordance with the characteristic K1 in FIG. 4, as a result of which, owing to the spring-loaded brake 2 being acted upon in the direction of the braking position, deceleration takes place in accordance with the characteristic V1. The spring characteristic of the spring 30 in this case determines the gradient of the characteristic K1 from the actuation travel X1 onwards.

In the case of a spring device 26 as shown in FIG. 3, only the spring 30 is acted upon in the direction of an increase in the spring force from the actuation travel X1 to the actuation travel X2, which corresponds to a value of approximately 55% of the maximum actuation travel. The actuation travel X2, in this case, corresponds to the distance "c" as shown in FIG. 3 between the further spring 40 and the spring plate 31, the further spring 40 bearing against the spring plate 31 in the case of the actuation travel X2. From the actuation travel X2 onwards, the spring 30 and the further spring 40 are thus acted upon in the direction of an increase in the spring force in the case of the spring device 26 shown in FIG. 3, with increasing actuation travel of the service brake input device 25. For the spring device 26, the characteristic K2 shown in FIG. 4 is thus set for the brake-release pressure P, and this characteristic leads to a deceleration as shown by the characteristic V2 in FIG. 5. The gradient of the characteristic K2 between the actuation travel X1 and the actuation travel X2 is, in this case, determined by the spring characteristic of the spring 30. The gradient of the characteristic K2 from the actuation travel X2 onwards is determined by the spring characteristics of the springs 30 and 40. In the case of the actuation travel X2, in this case a brake-release pressure P2 is set which approximately corresponds to 40% of the maximum brake-release pressure. The brake-release pressure P2 can, in this case, be altered and adjusted by the spring characteristic of the spring 30.

The actuation travel X3, which is adjusted to approximately 90% of the maximum actuation travel of the service brake input device 25, corresponds to the distance "a" in FIGS. 3 and 4 between the spring plate 31 and the sleeve-shaped spring bearing plate 32. In the case of the actuation travel X3, the spring bearing plate 32 thus comes into direct mechanical connection with the spring plate 31, the spring device 26 being overdriven, and the pressure reduction valve 8a being notched up mechanically in the direction of the switching position, which connects the brake-release line 7 to the tank line 23 with increasing actuation travel X, and, thus, the brake-release pressure P is reduced completely. As a result, a reliable reduction in the brake-release pressure and maximum deceleration of the working machine are achieved.

The brake-release pressure P3, which is set in the case of the actuation travel X3 and corresponds, as shown in FIG. 4, to a value of approximately 5% of the maximum brake-release pressure, can also be selected and altered by the spring characteristic of the spring 30 or the spring characteristics of the springs 30 and 40 and, thus, the gradient of the characteristics K1 and K2 such that, in the case of the actuation travel X3, the brake-release pressure P3 which is set is reduced completely and thus corresponds to the value 0%, with the result that, in the case of the actuation travel X3, the maximum deceleration results.

The distance "b" as shown in FIGS. 3 and 4 and, thus, the actuation travel X1, which determines the idle travel, can, in this case, be adjusted and altered by the adjustment element 36 of the spring device 26. The brake-release pressure P1 is determined by the pre-stress of the spring 30 of the spring device 26, it being possible to adjust and alter the pre-stress of the spring 30 and, thus, the brake-release pressure P1 by inserting insert washers, which are connected to the spring 30, for example insert washers, between the spring 30 and the spring plate 31 or the spring bearing plate 32. The distance "c" between the further spring 40 and the spring plate 31 shown in FIG. 3 and, thus, the actuation travel X2 can be altered and adjusted by insert washers, which can be brought into connection with the spring 40, for example insert washers, between the spring 40 and the spring bearing plate 32. In this case, the brake-release pressure P2 can be altered by the spring characteristic of the spring 30. The actuation travel X3 can be adjusted and altered by the distance "a" in FIGS. 2 and 3, it being possible for the brake-release pressure P3, which is set in the case of the actuation travel X3, to be altered by the spring characteristics of the springs 30, 40. The gradient of the characteristics K1, K2 from the actuation travel X1 onwards can be altered and adjusted by the spring characteristics of the springs 30, 40.

With the spring device 26 of the brake valve 8 according to the invention, it is thus possible to achieve metered braking of the working machine by a controllable reduction in the brake-release pressure in the case of a short idle travel of the service brake input device 25 between the actuation travel X1 of 4% of the maximum actuation travel and the actuation travel X2 of 90% of the maximum actuation travel. In comparison with a brake valve having the characteristic K3 shown in FIG. 3, in the case of which the brake-release pressure P1, which determines the build up of the braking torque by the spring-loaded brake, is reached in the case of an actuation travel X4 of approximately 35% of the maximum actuation travel, as a result of which a long idle travel up to the beginning of the braking function of the spring-loaded brake used as the service brake results and a controlled reduction in the brake-release pressure and, thus, metered braking of the working machine by the spring-loaded brake used as the service brake is made possible only in the region between the actuation travel X4 and the actuation travel X3, it is thus possible with the pre-stressed spring device 26 according to the invention to make available a short idle travel up to the beginning of the braking function of the spring-loaded brake used as the service brake and a large region between the actuation travels X1 and X3 of the service brake input device, in which metered braking of the working machine by the spring-loaded brake used as the service brake is made possible by a controllable reduction in the brake-release pressure.

Owing to the characteristics of the springs 30 and 40, the adjustment element 36 and the use of insert washers, which are connected to the springs 30 and 40, it is possible in this case for the actuation travels X1, X2, X3, the brake-release pressures P1, P2, P3, and the characteristics K2, K3 of the brake-release pressure and, thus, the deceleration V2, V3 of the working machine to be altered and adapted in a simple manner and with little complexity in terms of design, as a result of which it is possible to set, in a simple manner, a braking performance which is suitable for the working machine.

Figure 6:
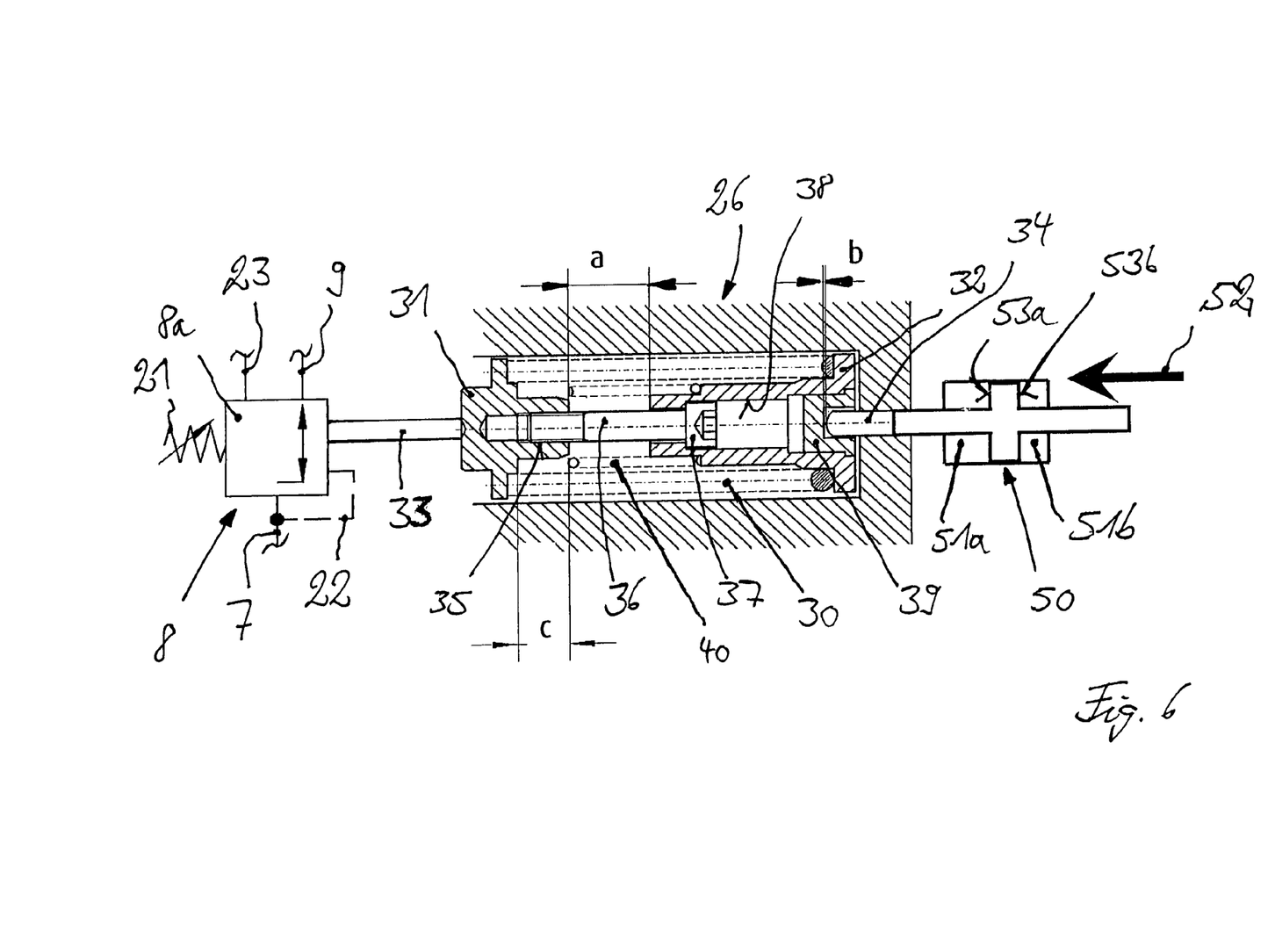
FIG. 6 shows a development of the brake valve.

In the development of the brake valve 8 shown in FIG. 6, a reaction device 50 is provided on the actuating plunger 34, which is connected to the service brake input device 25 and acts upon the spring device 26. The reaction device 50 is in the form of a piston 51, which has a first pressure space 51a having a first control pressure face 53a, which counteracts the actuation force which is to be applied to the service brake input device 25 and is illustrated by the arrow 52, and thus acts in the direction of an increase in the actuation force. A second pressure space 51b, which is provided with a second control pressure face 53b, acts in the direction of the actuation force and, thus, in the direction of a reduction in the actuation force.

The first pressure space 51a and the second pressure space 51b can be acted upon by the brake-release pressure arising in the brake-release line 7, as a result of which the actuation force can be weakened or intensified depending on the brake-release pressure produced and, thus, depending on the characteristic of the brake-release pressure. The control pressure faces 53a, 53b of the first pressure space 51a and of the second pressure space 51b can, in this case, have identical areas or areas of different sizes.

If the first pressure space 51a is acted upon by the brake-release pressure and the second pressure space 51b is relieved of load, the brake-release pressure counteracts the actuation force. With increasing actuation of the service brake input device 25 and, thus, decreasing brake-release pressure, in this case the actuation force to be applied to the service brake input device 25 can be weakened in a simple manner depending on the characteristic of the brake-release pressure.

In addition, it is possible to apply the constant supply pressure, which arises in the brake-release pressure supply line 9, to the first pressure space 51a and to apply the brake-release pressure to the second pressure space 51b. At the beginning of actuation, the maximum brake-release pressure thus arises in the second pressure space 51b, as a result of which, at the beginning of actuation of the service brake input device 25, the lowest actuation force arises. With increasing actuation of the service brake input device 25 and, thus, decreasing brake-release pressure, the braking force increases and, in the process, the actuation force of the service brake input device 25 increases in a manner inversely proportional to the decrease in the brake-release pressure.

With such a reaction device 50, which is acted upon by the brake-release pressure, it is possible in a simple manner to produce an actuation force characteristic which is matched to the characteristic of the brake-release pressure and, thus, the characteristic of the braking force, in which case it is possible to produce an increasing actuation force, in particular as the brake-release pressure decreases and the braking force increases.

Owing to this reaction of the brake-release pressure on the actuation force, a good metering capability of the parking brake, which is used as the service brake, is achieved for the operator in a simple manner.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A working machine, comprising:
   a spring-loaded brake having a braking position and a release position and controlled by a brake valve producing a brake-release pressure,
   wherein the brake valve is operatively connected to a service brake input device and is acted upon in a direction of a reduction in the brake-release pressure arising at the spring-loaded brake when the service brake input device is actuated,
   wherein upon actuation, the service brake input device is operatively connected to a pre-stressed spring device, which is operatively connected to the brake valve and is acted upon in a direction of an increase in the spring force on increasing actuation of the service brake input device,
   wherein the spring device has a spring clamped between a spring plate and a spring bearing plate and is connected to the spring plate,
   wherein the spring bearing plate is connected to the spring plate by an adjustment element, and
   wherein a distance between the spring bearing plate and the service brake input device is adjustable by the adjustment element.

2. The working machine according to claim 1, wherein the brake valve is a pressure reduction valve connected on the input side to a brake-release pressure supply line and on the output side to a brake-release line, which is connected to a control pressure space of the spring-loaded brake, which space acts in the direction of the release position and is connected to a tank line, which is connected to a tank, wherein the pressure reduction valve is acted upon by a spring in the direction of a switching position which connects the brake-release pressure supply line to the brake-release line and by the brake-release pressure arising in the brake-release line as well as by the spring device in the direction of a switching position which connects the brake-release line to the tank line.

3. The working machine according to claim 2, wherein the brake valve is a three-way pressure reduction valve.

4. The working machine according to claim 1, wherein a pre-stress of the spring device is dimensioned such that the brake-release pressure is reduced to a first value which is in the range in which the spring-loaded brake begins to build up a braking torque.

5. The working machine according to claim 1, wherein the pre-stress of the spring is adjustable.

6. The working machine according to claim 1, wherein the spring plate bears against a valve plunger of the brake valve.

7. The working machine according to claim 1, wherein the spring bearing plate is operatively connected to the service brake input device, the distance being formed between the spring bearing plate and the service brake input device when the service brake input device is not actuated.

8. The working machine according to claim 1, wherein the adjustment element is secured against becoming detached.

9. The working machine according to claim 1, wherein the spring bearing plate is a sleeve operatively connected to the spring plate when the service brake input device is actuated, a distance (a) being formed between the spring plate and the sleeve when the service brake input device is not actuated.

10. The working machine according to claim 1, wherein the service brake input device is a brake pedal.

11. The working machine according to claim 1, wherein the service brake input device is operatively connected to the spring device in the case of an actuation travel of 4% of a maximum actuation travel of the service brake input device.

12. The working machine according to claim 1, wherein the spring device can be overdriven in the case of an actuation travel of the service brake input device of 90% of the maximum actuation travel of the service brake input device.

13. The working machine according to claim 1, wherein the adjustment element is an adjustment screw.

14. The working machine according to claim 1, wherein the machine is an industrial truck.

* * * * *